United States Patent [19]

Kimmel

[11] E Patent Number: Re. 32,205

[45] Reissued Date of Patent: Jul. 15, 1986

[54] BASIC OXYGEN FURNACE CONSTRUCTION

[75] Inventor: Loren L. Kimmel, Chicago Heights, Ill.

[73] Assignee: Dresser Industries, Inc., Dallas, Tex.

[21] Appl. No.: 482,387

[22] Filed: Apr. 6, 1983

Related U.S. Patent Documents

Reissue of:

[64] Patent No.: 4,343,459
Issued: Aug. 10, 1982
Appl. No.: 184,824
Filed: Sep. 8, 1980

[51] Int. Cl.[4] ..... C21C 5/42

[52] U.S. Cl. ..... 266/243; 266/283

[58] Field of Search ..... 266/243, 280, 283; 75/60

[56] References Cited

U.S. PATENT DOCUMENTS

| | | | |
|---|---|---|---|
| 3,227,434 | 1/1966 | Voet | 266/243 |
| 3,294,386 | 12/1966 | Willenbrock | 266/36 |
| 4,069,633 | 1/1978 | Cooper | 266/283 |

*Primary Examiner*—Peter D. Rosenberg
*Attorney, Agent, or Firm*—J. N. Hazelwood; B. E. Deutsch

[57] ABSTRACT

A construction for the cone section zone of oxygen converter vessels consisting of a plurality of courses of refractory brick having a parallelogram configuration to provide a smooth surface for the working lining face.

4 Claims, 4 Drawing Figures

FIG. 1
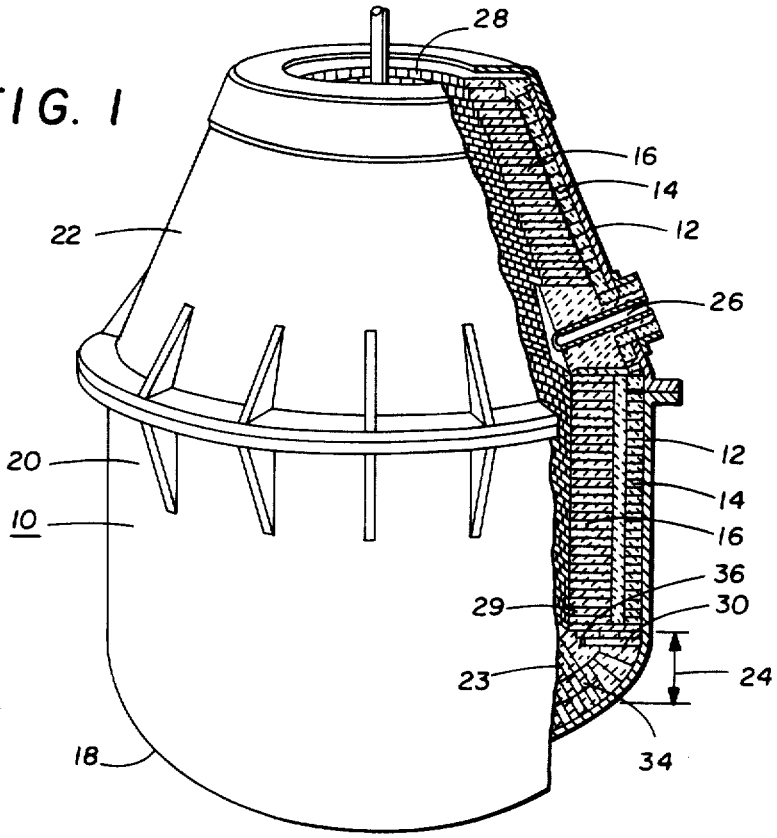
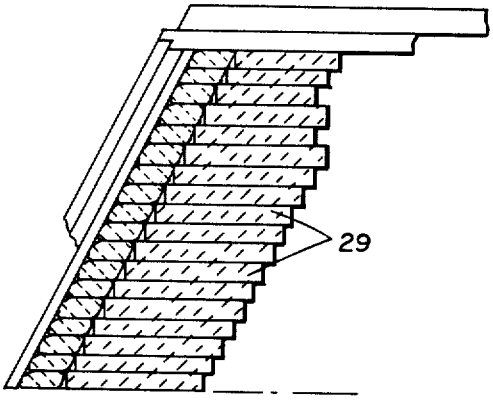
FIG. 2
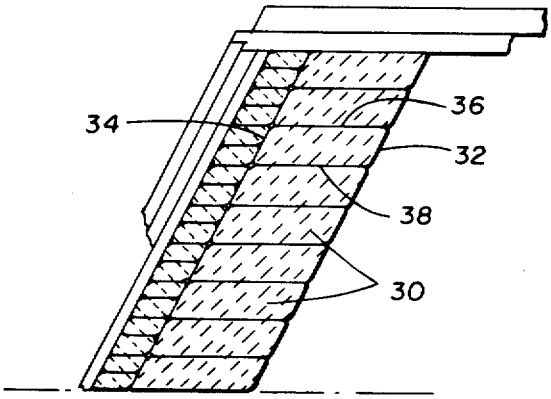
FIG. 3
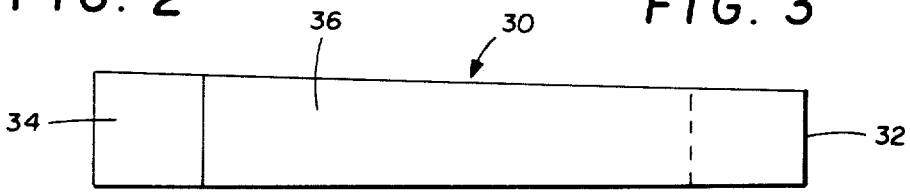
FIG. 4

BASIC OXYGEN FURNACE CONSTRUCTION

Matter enclosed in heavy brackets [ ] appears in the original patent but forms no part of this reissue specification; matter printed in italics indicates the additions made by reissue.

In the oxygen steel making process, which has been variously designated as the LD process, oxygen Bessemer process, and the oxygen converter process, the furnace structure fundamentally consists of a metal shell having a refractory lining disposed therein. The lining for oxygen steel furnaces consists of an inner or working lining and an exterior or tank lining, sometimes with an intermediate brick or rammed lining. The vessel is generally composed of three major zones, these three zones being the bottom zone, the barrel zone and the cone section zone. The bottom zone is generally dish-shaped and of upwardly opening concave configuration. The barrel zone extends from the dish-shaped bottom upwardly to the cone section zone. The cone section zone is of downwardly opening truncated cross-sectional configuration. Usually, brick in all three zones of the working lining are laid so that the end surface of smallest area is exposed to the interior of said vessel. Similarly, the brick in the tank lining are laid so that an end surface is adjacent the metal shell. The present invention is directed to the cone section zone.

Present cone sections are lined with standard design-keyed rings. Each course has a built in irregularity due to the slope of the cone itself and the use of straight keys. Each succeeding ring has about 1½" of hack on both the cold face and the hot face of the lining. In a 21" vertical section, there is really only 18" of effective brick thickness and in a 24" section, only 21" of effective thickness. This type of lining is very susceptible to physical damage when the lining is subjected to mechanical deskulling, thus leading to premature failure of the lining.

Accordingly, it is among the objects of the present invention to provide a cone section zone made from a refractory brick design that will provide approximately one half the number of horizontal joints of prior art designs, and a smooth no-hack hot face.

In order to more fully understand the nature and scope of the invention, reference should be had to the following description and drawings, in which:

FIG. 1 is a perspective view partially broken, of a typical oxygen converter vessel;

FIG. 2 is a partial section of typical prior art cone section zone construction;

FIG. 3 is a partial section of the cone section zone showing the construction of the present invention; and FIG. 4 is a plan view of the parallelogram shapes shown in FIG. 3.

Briefly, in accordance with the present invention, the improved construction in the cone section zone of a basic oxygen furnace working lining consists of a plurality of courses of refractory brick, which are parallelogram in configuration, and preferably wedge type brick, wherein opposed end surfaces of the shape are inclined with respect to the top and bottom surfaces. [Another way of saying this, is that one pair of opposed corners are at acute angles and the other pair are at obtuse angles.]

Referring to FIG. 1, there are shown a typical basic oxygen furnace 10 consisting of an outer metal shell 12, a shell protective brick lining 14 in contact with the inside surface of the shell, and a brick working lining 16. The vessel is constructed of three major zones, the bottom zone 18, the barrel zone 20 and the cone section zone 22. The bottom zone is dish-shaped and of upwardly opening concave configuration. The brick 23 in the bottom zone terminate in a knuckle area 24 with their face surfaces inclined from the vertical axis of the vessel. The barrel zone extends from the knuckle area upwardly to the cone section zone. The cone section zone, having the tap hole 26, extends upwardly and terminates in the form of a mouth 28 at the top of the vessel. The cone section zone is of downwardly opening truncated cross-sectional configuration. The typical construction of FIG. 1 more clearly shown in FIG. 2, shows the cone section zone to contain key type refractory brick 29 in the working lining, which creates the irregular hot face surface that is proned to damage in the deskulling operation.

FIG. 3 shows a cone section zone construction according to the present invention. The brick 30 employed to fabricate the cone section zone are parallelogram in cross-section. The opposed end surfaces 32 and 34 of the shapes are inclined with respect to the top and bottom surfaces, 36 and 38 respectively.

FIG. 4 shows the top surface 36 of shape 32. The wedge type construction has working lining end 32 of greater width than the tank lining end 34.

In practice, the working lining is laid as follows: the brick in the bottom zone are disposed in substantially the center of the zone for each course on the tank lining so that the face surfaces of the bottom brick are in alignment with the vertical axis of the vessel. The courses are the continued on the tank lining towards the curvature in the shell until the knuckle area is reached. At this point, the face surfaces of the brick are inclined from the vertical axis of the vessel. A plurality of wedge shaped brick are disposed in abutment with the terminal brick in the bottom zone so that the face surfaces of all of said knuckle brick are in alignment with the face surfaces of the terminal inclined brick. Then, the horizontal brick of the barrel zone are laid so that the face surfaces of the first brick course are contiguous with the surfaces of the knuckle area brick. The remainder of the barrel zone lining and the cone section zone lining is continued by stacking brick on brick in all of the courses. Accordingly, by using a wedge shape configuration as opposed to a key design, the number of horizontal joints is reduced and by using the parallelogram configuration, a smooth surface conforming to the surfaces of the remainder of the vessel, is obtained.

It should be appreciated, of course, that the size and quantity of the brick in the cone section zone, will vary depending on the size and shape of the oxygen steel making vessel. In addition, the size of the parallelogram shaped brick in a given vessel, may vary to obtain a sound and tight lining construction.

It is intended that the foregoing description and drawings be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. In an oxygen converter vessel, comprising a metal shell having a mouth at its top, a shell protective lining in contact with the inside surface thereof, and a working lining, said vessel constructed of three major zones, the bottom zone, the barrel zone, and the cone section zone, the three zones containing refractory brick having generally face, side and end surfaces, an end surface of each brick in these zones in the working lining being exposed to the interior of said vessel, the bottom zone being generally dish-shaped and of upwardly opening concave configuration, the brick in said zone terminating in a knuckle area with their face surfaces inclined from the vertical axis of the vessel, the barrel zone extending from the knuckle area upwardly to the cone section zone, the cone section zone being of downwardly opening truncated cross-sectional configuration, the improvement comprising a plurality of courses of refractory brick in the cone section zone, at the working lining, having a parallelogram cross-sectional configuration wherein opposed end surfaces of the shape are inclined with respect to the top and bottom surfaces. [and there are a pair of opposed acute angles and obtuse angles formed by the end surfaces and top and bottom surfaces.]

2. The vessel of claim 1 in which the brick are also wedge-shaped in configuration wherein the end surface exposed to the interior of the vessel is of [greater] *lesser* width than the opposite end surface.

*3. The vessel of claim 2 in which the end surfaces and top and bottom surfaces form a pair of opposed acute angles and obtuse angles.*

*4. The vessel of claim 1 in which the end surfaces and top and bottom surfaces form a pair of opposed acute angles and obtuse angles.*

* * * * *